May 10, 1960     L. MERKER     2,936,216
METHOD OF MAKING MONOCRYSTALLINE CALCIUM TITANATE
Filed Feb. 24, 1958
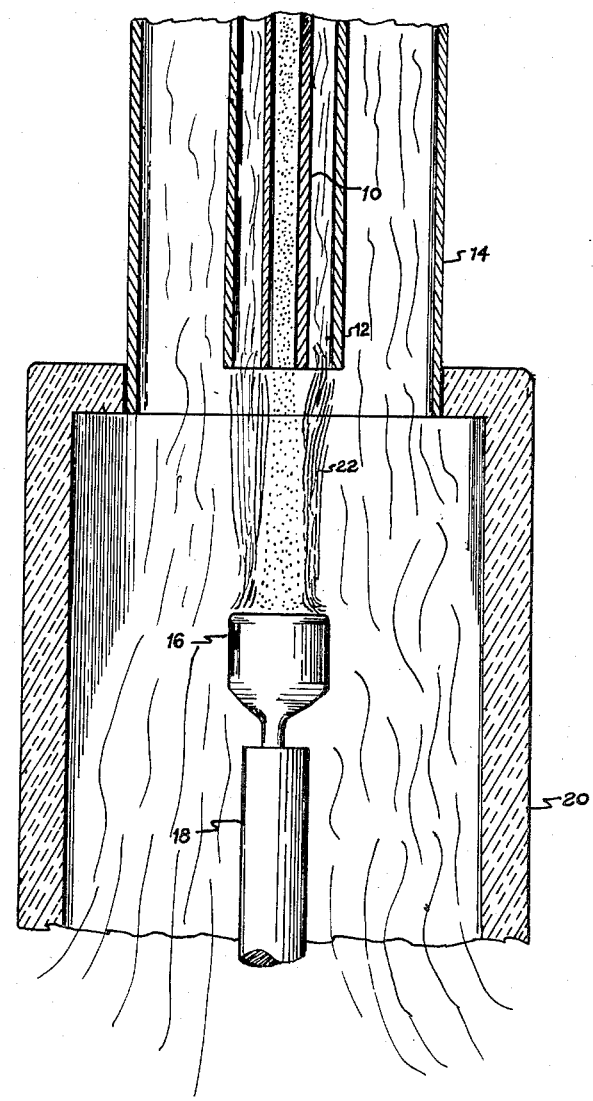
INVENTOR.
LEON MERKER
BY *Robert L. Holiday*
AGENT United States Patent Office 2,936,216
Patented May 10, 1960

2,936,216

METHOD OF MAKING MONOCRYSTALLINE CALCIUM TITANATE

Leon Merker, Bronx, N.Y., assignor to National Lead Company, New York, N.Y., a corporation of New Jersey Application February 24, 1958, Serial No. 717,215

3 Claims. (Cl. 23—51)

This invention relates in general to monocrystalline calcium titanate and to a method for making the same. More specifically, it relates to massive single crystal calcium titanate boules and to their method of preparation, the instant application being a continuation-in-part of my copending application Serial No. 335,343, filed February 5, 1953, now abandoned.

Calcium titanate is a fairly rare crystalline compound but has been found in nature, in a number of limited areas throughout the world, in various shapes and sizes and in extremely complex crystal configurations. It is black in color, usually orthorhombic and is always highly twinned.

Since a single crystal of calcium titanate possesses a high index of refraction and a low reciprocal relative dispersion or $v$ value, it would be desirable to produce a massive transparent calcium titanate crystal synthetically.

An object of this invention, therefore, is to provide massive monocrystalline calcium titanate which possesses a high index of refraction and a low reciprocal relative dispersion. A further object is to provide a method for producing a clear or colored glass-like calcium titanate boule. A still further object is to provide a monocrystalline calcium titanate boule which is free from twinning. A further object is to provide, as a new article of manufacture, a monocrystalline calcium titanate boule which can be cut and polished to form useful articles such as gems, lenses, prisms and the like. These and other objects will become apparent from the following more complete description of the invention.

Broadly, this invention contemplates monocrystalline calcium titanate in the form of a boule which is transparent and free from twinning, has an index of refraction of 2.4 and a reciprocal relative dispersion or $v$ value below 25.

This invention also contemplates a method for the preparation of a monocrystalline calcium titanate having the above mentioned physical properties which comprises fusing powdered calcium titanate in an oxyhydrogen flame, crystallizing the molten material to form a monocrystalline mass of calcium titanate in the form of a boule and heat treating said boule to anneal and to prevent twinning upon cooling.

The calcium titanate boule when formed in the boule furnace must be heat treated at a temperature of at least 1650° C. for at least 12 hours to anneal and prevent twinning in the single crystal boule.

The term calcium titanate is intended to embrace both pure $CaTiO_3$ and $CaTiO_3$ which contains impurities or coloring or modifying agents, either present or added, which are of a nature and in an amount so as not to affect the monocrystalline structure nor alter the desired color of the calcium titanate material produced. In most cases the impurities are held to a minimum and ordinarily will not exceed a few tenths of a percent and the modifying or coloring agents are added in an amount necessary to produce the desired effect.

It has been found that the temperature of the oxyhydrogen flame should be maintained somewhat above the melting point of the calcium titanate feed material, but should not exceed a temperature at which the molten material tends to flow over the edges of the pool at the top of the boule. The flame temperature may be maintained within these limits by adjusting the quantity and rates of flow of both the hydrogen and oxygen gases. It is important, however, that the flame be kept as constant as quiet as possible.

The preferred apparatus used in the instant invention is similar in its general construction to that shown in U.S. Patent No. 2,792,287, issued May 14, 1957, to Charles H. Moore, Jr., et al. and in Belgian Patent No. 491,522. The principal differences between the present preferred apparatus and those of the Moore application and Belgian patent are in the relation of the burner and chamber and the manner in which the gases are introduced.

In the apparatus shown in the drawing, the burner comprises three substantially concentric tubes 10, 12 and 14. The powdered calcium titanate is introduced through the center tube 10 with a portion of the oxygen and the remainder of the oxygen is introduced through the intermediate tube 12. The hydrogen is introduced through the outer tube 14 which may be slightly longer than the tubes 10 and 12. The boule 16 is formed on a pedestal 18 of suitable refractory material such as firebrick or zirconia and, as the boule grows, the pedestal 18 is lowered so that the top of the boule always remains about the same location in the flame.

The boule 16 and top of the pedestal 18 are surrounded by a chamber 20 of firebrick or the like and this chamber preferably surrounds the lower end of the outer tube 14. The gases are preferably fed at such rates that the flame fills and extends through the entire chamber 20 around the boule and in this way the temperature and other conditions around the boule are kept substantially constant. It has been found that smaller flames may be unsteady due to currents within the chamber and variations in the flame may cause damage to the boule.

In practice, the powdered calcium titanate is generally introduced periodically into the pipe 10 with a minor portion of the oxygen and the major portion of the oxygen is introduced through pipe 12. An excess of hydrogen is introduced through the pipe 14 to provide the proper temperature and large flame. In one burner the oxygen in the inner pipe 10, the oxygen in the intermediate pipe 12 and the hydrogen in the outer pipe 14 are introduced in the proportions 4:5:40 respectively.

A cone 22 forms within the flame below the pipes 10 and 12 and the pedestal 18 is preferably positioned so that the molten top of the boule 16 is at or near the point of the cone 22. In order to start such a single crystal to form it is desirable to first form a seed on the pedestal and then gradually build up the amount of molten material on the seed to form the crystal. Such a procedure allows the crystal to build up upon itself gradually increasing in diameter until a boule or carrot-shaped single crystal of calcium titanate is formed. The size of the orifices of the oxygen-hydrogen torch determines the size of the intensely heated zone which, in turn, determines the diameter of the carrot-shaped crystal produced.

It is preferred to employ calcium titanate in finely powdered form. The calcium titanate starting material should be substantially free from objectionable or incompatible impurities which detrimentally affect the crystal structure or the color or other properties of the crystal. Starting material should be finely divided and fairly uniform in size. For most efficient results, the calcium titanate starting material should possess an open structure with units capable of being rapidly melted. A calcium titanate starting material having an ultimate unit particle size of less than 1 micron has proved especially satisfactory. Aggregates of these small particles greater than 100 mesh should also be avoided as they do not tend to melt completely. The feed material should be free-flowing in order to feed properly.

Using an oxygen-hydrogen burner having concentric orifices, the center orifice carrying the oxygen gas and powdered calcium titanate feed material entrained in the oxygen, the intermediate orifice carrying the rest of the oxygen gas, and the outer orifice carrying the hydrogen gas, a single crystal boule of calcium titanate was prepared. The total gas flow of oxygen was 9 liters per minute, 4 liters through the center orifice and 5 liters through the intermediate orifice, while the flow of hydrogen was 40 liters per minute.

After the boule had reached a sufficient size, e.g. 100 carats, the boule was then heat treated in an oxidizing atmosphere at elevated temperatures to anneal and to prevent the boule from twinning. This heat treatment should take place immediately without allowing the boule to cool below 1500° C. i.e. after the boule has been formed in the furnace, and before the temperature of the boule drops below 1500° C., the boule is heat treated at a temperature of at least 1650° C. to as high as 1750° C. for a period of at least 12 hours up to 48 hours to anneal and to prevent twinning. Following the heat treatment, the boule is allowed to cool slowly, i.e. not faster than 30° C. per hour.

The calcium titanate boule so formed is a clear, transparent single crystal free from twinning and strains. Such a transparent mass of monocrystalline material may be shaped for various purposes such as, for example, blanks suitable for preparation of lenses, prisms and other optical products, ornamental objects and novelty gems, which depend for their attractiveness and usefulness on the high refractive index of the material of which they are composed; or other objects which derive their utility from other properties of calcium titanate.

The index of refraction of the calcium titanate boule is 2.4 and the reciprocal relative dispersion is below 25.

From the above description it is apparent that the present invention provides detwinned monocrystalline calcium titanate having high index of refraction and high dispersion and also provides a method for producing such crystals. The process is simple and economical to employ and the crystals have gemstone, optical and other uses.

While this invention has been described and illustrated by the examples shown, it is not intended to be strictly limited thereto and other modifications and variations may be employed within the scope of the following claims.

I claim:

1. Method for the production of substantially white monocrystalline calcium titanate boule which comprises periodically introducing powdered calcium titanate into a stream of oxygen, surrounding said stream of oxygen with a stream of hydrogen and forming an oxyhydrogen flame having a central oxygen cone, melting the powdered calcium titanate in said oxyhydrogen flame, crystallizing the molten material adjacent the end of the oxygen cone to form a monocrystalline boule, maintaining the said flame about the boule, and without allowing the boule to cool below 1500° C. heat treating the boule by subjecting said boule to an oxidizing treatment at a temperature of at least 1650° C. for a period of at least 12 hours to anneal and to preclude twinning.

2. Method according to claim 1 in which the heat treatment is carried out at a temperature between 1650° C. and 1750° C. for a period from 12 hours to 48 hours.

3. Method according to claim 2 in which the heat treated boule is cooled to room temperature at a rate lower than 30° C. per hour.

References Cited in the file of this patent

UNITED STATES PATENTS

| | | |
|---|---|---|
| 2,507,253 | Hawatt | May 9, 1950 |
| 2,764,490 | Merker | Sept. 25, 1956 |